Patented July 6, 1954

2,683,157

UNITED STATES PATENT OFFICE 2,683,157

CARBOXYCYCLOPENTADIENYL(CYCLOPENTADIENYL)IRON

Viktor Weinmayr, Landenberg, Pa., assignor to E. I. du Pont de Nemours and Company, Wilmington, Del., a corporation of Delaware No Drawing. Application October 2, 1952, Serial No. 312,853

1 Claim. (Cl. 260—439)

This invention relates to the new compound carboxycyclopentadienyl(cyclopentadienyl)iron.

Organo-metallic compounds in which the metal is directly attached to a hydrocarbon radical make up an important class of compounds. Well-known examples include tetraethyl lead, the universally used anti-knock agent for internal combustion engines, ethyl mercury compounds which are important as fungicides, and the arkyl and aryl derivatives of magnesium, sodium, lithium and the like which are useful in organic syntheses. Until very recently, no corresponding compounds of iron were known. The first such compound to be discovered was dicyclopentadienyliron, which was first disclosed in an article by Kealy and Pauson appearing in Nature 168, 1039 (1951) and is claimed in U. S. application Serial No. 291,567, filed June 5, 1952. This compound may also be called bis-cyclopentadienyliron.

Very recently the preparation of diacyl derivatives of this compound by the reaction of dicyclopentadienyliron with acid chlorides or acid anhydride using aluminum chloride as the condensing agent has been described by Woodward, Rosenblum and Whiting in J. Am. Soc. 74, 3458 (1952). In my pending U. S. application Serial No. 312,852, filed October 2, 1952, there are described and claimed monoacyl derivatives of dicyclopentadienyliron and the process of preparing them by reacting dicyclopentadienyliron with an acylating agent in the presence of anhydrous hydrogen fluoride.

It is an object of the present invention to provide a new organo-iron compound from which other derivatives may easily be synthesized. Further objects will appear from the description of this invention which folows.

Carboxycyclopentadienyl(cyclopentadienyl)iron is a stable crystalline compound which is soluble in aqueous alkali solutions. It has the formula $C_{10}H_9FeCOOH$. The point of attachment of the carboxylic acid group to the cyclopentadiene nucleus is not known. According to the formulation of Wilkinson et al. in J. Am. Soc. 74, 2125 (1952) of the dicyclopentadienyliron structure, all five positions on the cyclopentadienyl ring are equivalent and hence only a single mono-substituted derivative is possible.

The carboxycyclopentadienyl(cyclopentadienyl)iron is readily prepared by oxidizing a monoacyl derivative of dicyclopentadienyliron, such as the monoacetyl derivative. This oxidation may conveniently be performed by heating with an alkali hypohalite, such as sodium hypochlorite, or alternatively by heating with iodine in pyridine to form a dicyclopentadienyliron acyl pyridinium iodide and thereafter adding an alkaline solution to cleave this compound and to form the carboxycyclopentadienyl (cyclopentadienyl) iron. This latter procedure is similar to that described by King in J. Am. Soc. 66, 894 (1944) for the oxidation of various methyl ketones. Other methods of oxidation are also applicable.

The methods of preparing the compounds of this invention are illustrated by the following examples.

*Example 1*

A sodium hyprochlorite solution is prepared by introducing 19 grams of chlorine into a solution of 26 grams of sodium hydroxide in 240 grams of ice and water. Care is taken that the temperature does not exceed 10° C. during the introduction of the chlorine and that the solution remains alkaline. This solution is then heated to 80° and 6.84 grams of acetylcyclopentadienyl(cyclopentadienyl)iron (m. p. 86°) prepared according to the method disclosed in my copending application Serial No. 312,852, filed October 2, 1952, are added over a period of about 5 minutes while maintaining the temperature at 80-85°. The reaction is slightly exothermic. The temperature is raised to 90° after the addition of the acetylcyclopentadienyl(cyclopentadienyl)iron is finished and the charge is agitated at 90-95° for about one hour. No excess of hypochlorite remains after this period.

The charge is then filtered while still hot. About 5 grams of a non-fusible brown solid are obtained. The pale yellow filtrate (about 400 ml.) is acidified while still warm. A crystalline precipitate forms, which is filtered at 25°, and washed acid-free. After drying it amounts to 0.95 gram equal to a yield of 14% when calculated as carboxycyclopentadienyl(cyclopentadienyl)iron. The decomposition range of this crude product is 180-200°. The product is readily soluble in methanol, and crystallizes well from gasoline (boiling range 110-120°). The total crude product is dissolved in 120 ml. of boiling gasoline, clarified from a small amount of insoluble impurities, and the pale yellow filtrate is cooled to 10°. The crystallization is repeated using 90 ml. of gasoline. Pure carboxycyclopentadienyl(cyclopentadienyl)iron is obtained as long felted needles, light tan in color, and melting with decomposition at 225-230° when heated rapidly in a melting point bath using an open or a closed melting point tube. During the heating and at about 180-200° the tan color of the crystals appears to change to orange. The product dissolves in 96% sulfuric acid with a cerise color similar to the color formed when the starting material is dissolved in 96% sulfuric acid. In contrast to acetylcyclopentadienyl(cyclopentadienyl)iron, the carboxycyclopentadienyl(cyclopentadienyl)iron is not soluble in 36% aqueous hydrochloric acid.

Anal.—Calcd. for $C_{11}H_{10}FeO_2$: C, 57.4%; H, 4.35; Fe, 24.33; M. W. 230. Found: C, 57.40; H, 4.51; Fe, 23.50; M. W. (by titration with NaOH), 226.4.

Example 2

Forty-six (46) grams of acetylcyclopentadienyl(cyclopentadienyl)iron are dissolved in 100 grams of pyridine at 20° C. and 51 grams of iodine are added at uniform intervals to the solution over a period of one hour while keeping the reaction temperature at 20–30°. Slight cooling is necessary. After agitating at 20–30° for 90 minutes the charge is heated in boiling water for 90 minutes. The temperature of the charge does not rise over 95°. A heavy crystalline precipitate is formed. During cooling to room temperature and while standing overnight the charge becomes nearly completely solid.

One thousand (1000) ml. of water and 25 grams of sodium hydroxide are then added and the charge is agitated at room temperature for about 24 hours. The charge is then filtered from some dark brown insoluble material. The filtrate, measuring 950 ml., is of a light orange color. It is acidified at room temperature with 200 grams of glacial acetic acid.

Carboxycyclopentadienyl(cyclopentadienyl)iron precipitates as light orange, well defined needles. After filtration, washing, and drying at 80–85°, 22 grams of carboxycyclopentadienyl(cyclopentadienyl)iron are obtained equal to a yield of 47.8% based on the acetylcyclopentadienyl(cyclopentadienyl)iron. The product melts (with decomposition) at 220–225° C. an is sufficiently pure for use in the preparation of other derivatives.

The compound of this invention is soluble in a number of organic solvents and is also soluble in aqueous alkaline solutions and consequently provides a means for providing an organoiron compound in solution in a form in which it can take part in a wide variety of reactions to form derivatives such as esters and amides.

I claim:

Carboxycyclopentadienyl(cyclopentadienyl)iron.

References Cited in the file of this patent

Woodward et al., J. Am. Chem. Soc., pages 3458–59, vol. 74, July 5, 1952.